United States Patent [19]
Chiba et al.

[11] Patent Number: 5,717,532
[45] Date of Patent: Feb. 10, 1998

[54] REFLECTION-TYPE COMPOUND OPTICAL ELEMENTS

[75] Inventors: Toru Chiba; Masaki Shimizu; Jun Hirakawa, all of Tokyo, Japan

[73] Assignee: Asahi Kogaku Kogyo Kabushiki Kaisha, Tokyo, Japan

[21] Appl. No.: 650,882

[22] Filed: Oct. 30, 1996

Related U.S. Application Data

[63] Continuation of Ser. No. 343,917, Nov. 17, 1994, abandoned.

[30] Foreign Application Priority Data

Nov. 17, 1993 [JP] Japan .................................. 5-288049
Sep. 16, 1994 [JP] Japan .................................. 6-222097

[51] Int. Cl.$^6$ .............................. G02B 5/10; G02B 5/08
[52] U.S. Cl. ........................ 359/868; 359/883; 359/884
[58] Field of Search .................................. 359/726, 727, 359/728, 868, 869, 883, 884

[56] References Cited

U.S. PATENT DOCUMENTS

| | | | |
|---|---|---|---|
| 3,010,153 | 11/1961 | Bittner | 359/869 |
| 3,776,805 | 12/1973 | Hansen | 428/35.9 |
| 3,873,191 | 3/1975 | Veret et al. | 359/869 |
| 3,876,734 | 4/1975 | Howden | 264/2.4 |
| 3,917,766 | 11/1975 | Howden | 264/1.7 |
| 3,922,327 | 11/1975 | Howden | 264/2.4 |
| 4,071,736 | 1/1978 | Kamerling | 219/219 |
| 4,319,945 | 3/1982 | Howden | 156/212 |
| 4,432,832 | 2/1984 | Fantone | 216/24 |
| 4,470,053 | 9/1984 | Maffitt et al. | 369/84 |
| 4,657,354 | 4/1987 | Kobayashi | 359/718 |
| 4,683,153 | 7/1987 | Goepfert et al. | 428/1 |
| 4,738,516 | 4/1988 | Verhoeven et al. | 359/718 |
| 4,989,967 | 2/1991 | Matsuda | 351/165 |
| 5,137,661 | 8/1992 | Kanome et al. | 264/1.33 |
| 5,234,792 | 8/1993 | Koyama et al. | 430/270 |
| 5,428,599 | 6/1995 | Yashima et al. | 369/283 |
| 5,440,411 | 8/1995 | Fujiwara et al. | 359/42 |

FOREIGN PATENT DOCUMENTS

| | | |
|---|---|---|
| 0540480 | 2/1941 | United Kingdom . |
| 1343164 | 1/1974 | United Kingdom . |
| 2038698 | 12/1978 | United Kingdom . |

OTHER PUBLICATIONS

Proceedings of the SPIE, vol. 760, 1987, pp. 29–35.

*Primary Examiner*—David C. Nelms
*Assistant Examiner*—Jordan M. Schwartz
*Attorney, Agent, or Firm*—Greenblum & Bernstein P.L.C.

[57] ABSTRACT

Reflection-type compound optical elements include a substrate, an aspherical resin layer and a high reflectance layer. The substrate, the aspherical layer and the high reflectance layer are laminated in an optional order to form a laminate structure.

12 Claims, 2 Drawing Sheets

REFLECTION-TYPE COMPOUND OPTICAL ELEMENTS

This application is a continuation of application Ser. No. 08/343,917, filed Nov. 17, 1994, now abandoned.

BACKGROUND OF THE INVENTION

1. Field of the Invention

The present invention relates to a reflection-type compound optical element, more particularly, a reflection-type compound optical element such as an aspherical mirror, typically a parabolic mirror. The reflection-type compound optical element of the present invention can be advantageously used in the production of a wide variety of optical devices or instruments.

2. Description of the Related Art

Hitherto, a so-called "aspherical mirror", a typical example of which is a parabolic mirror, has been widely utilized in a plurality of optical instruments, since it is an optical element containing an optical system having no aberration or capable of conducting an optional compensation of aberration. The optical element has been generally produced by using substrates such as a glass, metal or plastics.

In the production of the aspherical mirror, when glass is used as a substrate material, it is conventional to produce an aspherical surface by cutting a surface of the glass substrate to a predetermined shape and then polishing the cut surface. The polished aspherical surface is coated with a thin layer of the material having a high reflectivity to obtain an aspherical mirror. The above production process, however, has a drawback in that it is not suitable for the mass production of aspherical mirrors, because the polishing of the aspherical surface lowers the productivity of the aspherical mirrors. Similar drawbacks can be found when a metal is used as the substrate material in the production of aspherical mirrors, because the metal substrate must be cut using a lathe or other similar machine and then the cut surface must be polished to form a polished aspherical surface, as in the glass substrate.

Further, when a plastic is used as the substrate material, a metal substrate having a polished aspherical surface, produced, for example, in the above-mentioned process, is used as a mold, and the selected plastic is poured into and molded therein to produce a molded article having the intended aspherical surface. The molded article is then coated with a thin layer of a material having a high reflectivity to obtain the aspherical mirror. The plastic substrate is suitable for the production of aspherical mirrors, because it has a lower weight than the above-mentioned substrates such as glass and metal, is easily moldable, has a good productivity, exhibits an excellent resistance to impact, and is also excellent from the view of safety. Moreover, as a recent tendency, plastic substrates have been widely utilized as a substrate for the production of optical elements other than the aspherical mirrors, because of these many notable advantages. However, the plastic substrate can not be advantageously utilized if a high accuracy is required in the resulting optical elements, because the thermal expansion coefficient of plastics is higher than that of glass or metal and the resulting optical elements suffer from residual strain caused during the molding of the plastic substrate. The residual strain in the elements means a lowered accuracy of the configuration and other disadvantages.

SUMMARY OF THE INVENTION

The object of the present invention is to solve the drawbacks of the above-described prior art optical elements, and accordingly provide a reflection-type aspherical optical element which has a high accuracy and a good manufacturability, and which is suited for mass production.

According to the present invention, the above object can be attained by using a synthetic resin or plastic material as an aspherical layer-providing material in the production of a reflection-type aspherical optical element, wherein a reflection type compound optical element comprises a substrate, an aspherical resin layer, and a high reflectance layer. The substrate, the aspherical layer and the high reflectance layer are laminated in an optional order to form a laminate structure.

In a first aspect of the present invention, there is provided a reflection-type compound optical element which comprises a substrate having applied on a single surface thereof, in an optional order, an aspherical resin layer and a high reflectance layer to form a laminate structure.

In the reflection-type compound optical element, it is preferred that the aspherical resin layer comprises a photopolymerizable resin or a thermally polymerizable resin. It is also preferred that the high reflectance layer comprises a metal material selected from the group consisting of aluminum, silver, gold and copper. Further, it is preferred that the substrate comprises a glass, metal or ceramics material.

In a second aspect of the present invention, there is provided a reflection-type compound optical element which comprises a substrate having applied on a surface thereof an aspherical resin layer and on another surface thereof, opposite to this aspherical resin layer, a high reflectance layer.

In the reflection-type compound optical element, it is preferred that the aspherical resin layer comprises a photopolymerizable resin or a thermally polymerizable resin. It is also preferred that the high reflectance layer comprises a metal material selected from the group consisting of aluminum, silver, gold and copper. Further, it is preferred that the substrate comprises glass.

In a third aspect of the present invention, there is provided a reflection-type compound optical element which comprises a substrate having applied on a lapped surface thereof an aspherical resin layer. The highly polished lapped surface functions as a reflection surface and therefore does not require a high reflectance layer further applied thereto.

In the reflection-type compound optical element, it is preferred that the aspherical resin layer comprises a photopolymerizable resin or a thermally polymerizable resin. It is also preferred that the substrate comprises a metal material selected from the group consisting of stainless steel, tungsten carbide, phosphor bronze, copper or aluminum.

According to the present invention, it becomes possible to produce reflection-type aspherical compound optical elements at a low cost and on a mass production scale without suffering from a nonuniformity in the shape of the resulting elements. In other words, the reflection-type aspherical compound optical elements according to the present invention can satisfy the requirements for a high accuracy, ease of fabrication or good processability and an increased capability for mass production. These remarkable advantages of the present invention are in contrast to the prior art reflection-type aspherical optical elements which, as previously mentioned, have unavoidable drawbacks such as a nonuniformity of the shape in the mass production and a poor processability.

BRIEF DESCRIPTION OF THE DRAWINGS

The present invention will be more clearly understood from the description as set forth below with reference to the accompanying drawings, wherein.

DESCRIPTION OF THE PREFERRED EMBODIMENTS

Figure 1:
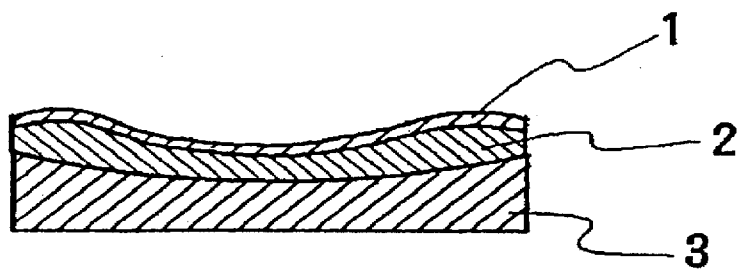
FIG. 1 is a cross-sectional view of the compound optical element according to a preferred embodiment of the present invention.

The present invention will be further described with reference to preferred embodiments thereof.

The reflection-type, compound aspherical optical element according to the present invention, as above mentioned, is characterized by having an aspherical resin layer and a high reflectance layer on one surface of the substrate or is characterized by having only an aspherical resin layer on a finely lapped surface of the substrate. Further, more particularly, the former constitution of the optical element can include the following three embodiments:

1. The optical element comprises an aspherical resin layer then a high reflectance layer in the recited order on top of a single surface of the substrate. A typical example of the optical element according to this embodiment is illustrated in the attached FIG. 1 which will be described hereinafter.

2. The optical element comprises a high reflectance layer then an aspherical resin layer in the recited order on top of a single surface of the substrate. A typical example of the optical element according to this embodiment is illustrated in the attached FIG. 2 which will be described hereinafter.

3. The optical element comprises an aspherical resin layer on one surface of the substrate and a high reflectance layer on the other surface of the substrate. A typical example of the optical element according to this embodiment is illustrated in the attached FIG. 3 which will be described hereinafter.

In the reflection-type compound optical element according to the present invention, any conventional substrate material may be used as a substrate. Generally, glass, metals, ceramics materials and other conventional materials can be advantageously used as a substrate. Preferably, glass is used as a substrate for the optical elements according to the above-mentioned third embodiment. For the first embodiment glass or some other high transmittance material need only be used for the substrate when a UV cured adhesive is used to bond the substrate to the optical elements, metals and ceramics may be used for the substrate in the first embodiment when a thermally cured adhesive is used. Glass, metals or ceramic materials are used as a substrate for the optical elements according to the above-mentioned second embodiment. Glass used as the substrate may contain any additional layers or coatings in order to improve the optical and other properties thereof, if desired. Further, typical examples of useful metals include stainless steel, copper, aluminum and the like, and typical examples of useful ceramics materials include alumina, silicon nitride and the like.

In another aspect of the present invention, if the material to be used as a substrate has a high reflectivity and is able to be fabricated to form a lapped surface, it becomes possible to omit a high reflectance layer from the optical elements, instead only an aspherical resin layer is required to be formed over the surface of the substrate. The substrate useful in the optical elements of the described layer structure includes, for example, a metal substrate selected from the group consisting of stainless steel, tungsten carbide, phosphor bronze, copper, aluminum and the like. The metal substrate used herein may contain one or more additional layers or coatings applied to a surface thereof in order to improve the processability of the lapped surface such as a nickel plating layer having a thickness of 10 to 300 microns.

In the present invention, an aspherical resin layer of the optical elements comprises a photopolymerizable resin or a thermally polymerizable resin. The photopolymerizable resin used herewith may be optionally selected from the well-known photopolymerizable resins, and typical examples of useful photopolymerizable resins, while not limited to the below-listed resins, include a urethane-acrylate resin, an acrylic resin, a methacrylic resin and the like. The photopolymerizable resin is used in combination with any conventional photopolymerization initiators, and it may also contain other additives, if necessary. In addition, the thermally polymerizable resin used herewith may be optionally selected from the well-known thermally polymerizable resins, and typical examples of useful thermally polymerizable resins, while not limited to the below-listed resins, includes both a thermosetting resin such as an epoxy resin, a diallylphthalate resin, a thermosetting polyurethane resin, an unsaturated polyester resin and the like, and a thermoplastic resin such as an acrylic resin, a polyurethane resin and the like. Among these thermally polymerizable resins, it is preferred to use thermosetting resins which exhibit only a small amount of shrinkage upon setting.

The high reflectance layer of the optical elements comprises a metal material, and suitable metal material is preferably selected from aluminum, silver, gold, copper and similar metals. Using these metals, the high reflectance layer can be preferably produced in accordance with any conventional coating or layer-forming methods such as vacuum deposition, sputtering, ion plating and the like.

Next, the compound optical elements according to preferred embodiments of the present invention and the production thereof will be described in detail with reference to the attached FIGS. 1 to 4.

FIG. 1 is a cross-sectional view of the compound optical element according to a preferred embodiment of the present invention. The optical element, as illustrated, comprises a glass substrate 3 having deposited on an upper surface thereof an aspherical resin layer 2 and a high reflectance layer 1 thinner than the layer 2.

The illustrated optical element can be produced by, for example, providing a glass substrate 3 having a previously fabricated spherical surface. The spherical surface of the glass substrate 3 is first coated with an aspherical resin layer 2 in a mold having the desired aspherical shape. After removal from the mold, the aspherical resin layer 2 is coated with a high reflectance layer 1 from a suitable material having a high reflectivity to form a mirrored surface. Of course, any conventional coating method may be used in the formation of the high reflectance layer 1, and the conditions of coating can be suitably determined depending upon the configuration of the underlying aspherical resin layer 2.

In the production of the illustrated optical element, if a photopolymerizable resin is used as an aspherical resin layer-providing material, it is required that both surfaces of the glass substrate have a ground or polished surface and the glass substrate has an increased light transmittance. However, these restrictions are removed, if a thermally polymerizable resin is used as an aspherical resin layer-providing material. Note, however, for both of said polymerizable resins that the resin should have a high resistance to change of the optical properties and mechanical properties during the subsequent formation of the high reflectance layer.

Figure 2:
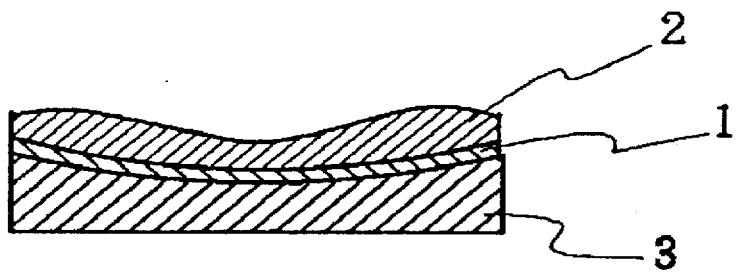
FIG. 2 is a cross-sectional view of the compound optical element according to another preferred embodiment of the present invention.

FIG. 2 is a cross-sectional view of the compound optical element according to another preferred embodiment of the present invention. As is illustrated, the optical element is similar to that of FIG. 1 except that an aspherical resin layer 2 was laminated over a glass substrate 3 after the formation of a high reflectance layer 1 on the glass substrate. Other substrate materials such as metals or ceramics may be used as a substrate 3 in place of glass, if desired.

The illustrated optical element can be produced by, for example, depositing a high reflectance layer on top of substrate 3 and then forming an aspherical resin layer 2 in a mold having a desired aspherical configuration previously fabricated therein. Glass, metal or ceramic material may be used as a substrate material. For the illustrated instance, it is preferred that a thermally polymerizable resin is used as an aspherical resin layer providing material in order to avoid difficulty in obtaining a high enough light transmittance to allow photopolymerization in the aspherical resin layer-providing material to occur.

Figure 3:
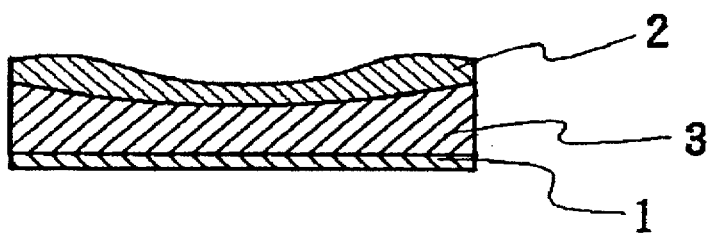
FIG. 3 is a cross-sectional view of the compound optical element according to another preferred embodiment of the present invention.

FIG. 3 is a cross-sectional view of the compound optical element according to another preferred embodiment of the present invention. A glass substrate 3 has an aspherical resin layer 2 on one surface thereof, and a high reflectance layer 1 on the other surface thereof. The high reflectance layer 1 is disposed on the opposite side of the substrate 3 to the side of the aspherical resin layer 2.

The illustrated optical element can be produced by separately forming a high reflectance layer 1 and an aspherical resin layer 2 on opposite surfaces of the substrate 3 in accordance with a manner similar to that used in the production of the elements of FIGS. 1 and 2. Note that in the illustrated instance, as with the previously illustrated instances, it is preferable to lapp the surface of the substrate to which the high reflectance layer 1 is applied. The formation of the high reflectance layer 1 and the molding of the aspherical resin layer 2 may be carried out in any desired order, namely, the layer 1 may be formed before or after molding of the layer 2. In this connection, if a photopolymerizable resin is used as an aspherical resin layer-providing material, it is preferred to mold the aspherical resin layer prior to the formation of the high reflectance layer 1, because the photopolymerization of the said material depends on a transmittance of light in the element. In addition, in this instance, it is necessary to modify a configuration of the reflecting surface of the reflectance layer 1 so that any aberration caused between the resin layer 2 and the glass substrate 3 can be suitably corrected, while a limitation in the design of the element may be accompanied by such modification of the layer configuration. It is also necessary to control the distribution of the light incident on the resin layer so that a substantially suitably adjusted amount of light can be applied to an overall photopolymerization area of the resin layer.

Figure 4:
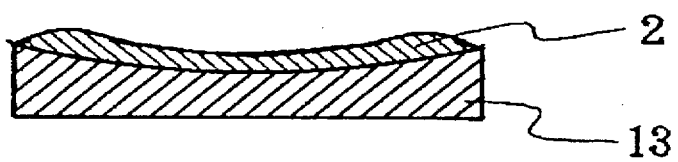
FIG. 4 is a cross-sectional view of the compound optical element according to still another preferred embodiment of the present invention.

The compound optical element of FIG. 4 comprises a metal substrate 13 having an aspherical resin layer 2 on a lapped surface thereof. Adopting the illustrated structure, it becomes possible to provide an intended reflection-type aspherical mirror without using a reflecting layer.

Finally, the present invention will be more completely described based on the following working examples and referring to the accompanying drawings. Note, however, that the present invention should not be restricted by these examples.

EXAMPLE 1

Used herein is a glass substrate having a diameter of 20 mm made of an optical glass commercially available as "BK 7". The glass substrate contains a curved surface having a radius of curvature of 45 mm, and a flat surface opposed to the curved surface.

Figure 5:
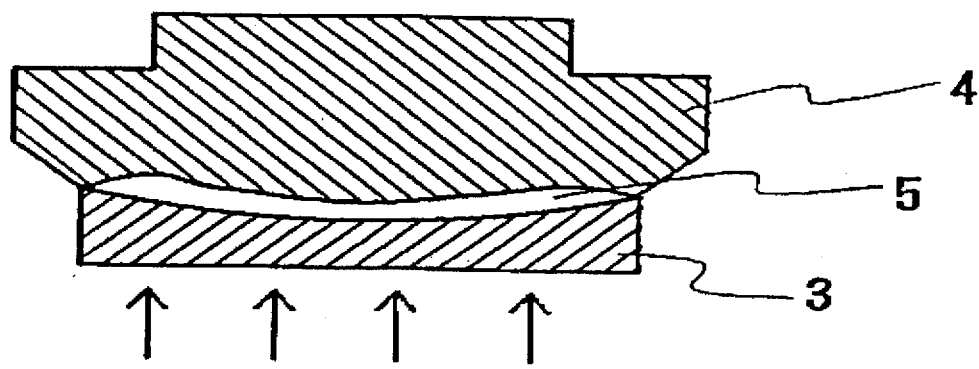
FIG. 5 is a cross-sectional view illustrating a molding step of the aspherical resin layer in the below described Example 1.
Figure 6:
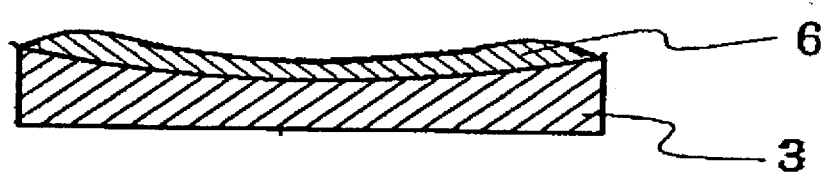
FIG. 6 is a cross-sectional view of the optical substrate produced in the Example 1.

After both surfaces of the glass substrate were polished, a mold 4 having a previously fabricated aspherical surface as a molding surface was applied to a glass substrate 3 as is shown in FIG. 5, and then an ultraviolet-setting, urethane-acrylate resin was poured into the gap or cavity 5 of a predetermined size defined by the mold 4 and the substrate 3. Then, ultraviolet radiation was irradiated onto the back surface of the substrate 3 as is shown by arrows to harden the poured urethane-acrylate resin. After hardening of the resin was complete, the mold 4 was separated from the substrate 3. As shown in FIG. 6, an optical substrate containing an aspherical resin layer 6 on a surface of the glass substrate 3 was obtained. The aspherical resin layer 3 had a thickness of 200 microns (central portion) and 300 microns (peripheral portion).

After formation of the optical substrate, an aluminum layer having a thickness of about 200 nm was vacuum deposited over the aspherical resin layer 6 of the substrate. An aspherical mirror was thus obtained.

EXAMPLE 2

Used herein is a glass substrate having a diameter of 50 mm made of an optical glass commercially available as "BK 7". The glass substrate contains a curved surface having a radius of curvature of 53 mm, and a flat surface opposed to the curved surface.

Figure 7:
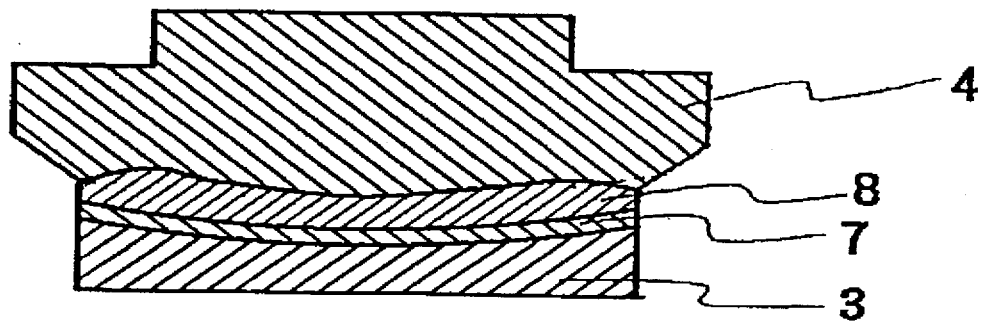
FIG. 7 is a cross-sectional view illustrating the intermediate product obtained in the course of the production of the composite optical element in the below described in the Example 2.

After one surface of the glass substrate 3 to which an aspherical resin layer was to be applied was polished, the polished surface of the substrate 3 was vacuum deposited with aluminum to make a thin layer of aluminum having a thickness of about 200 nm, i.e. the high reflectance layer 7, as shown in FIG. 7. Then, the mold 4 having a previously fabricated aspherical surface as a molding surface was fixedly mounted over the layer 7 of the substrate 3 so that a gap or cavity having a predetermined size could be defined between the mold 4 and the layer 7. After the formation of the gap, a thermosetting epoxy resin was poured into this gap. The epoxy resin used herein is based on a bisphenol A epoxy resin composition and contains methylhexylhydrophthalic acid as a hardening agent. The molding apparatus was heated to a temperature of 130° C. to harden the epoxy resin in the gap. After hardening of the resin was completed, the mold 4 was separated from the substrate 3. An aspherical mirror containing an aspherical epoxy resin layer 8 was obtained. The aspherical resin layer 8 had a thickness of 100 microns at a central portion thereof and a maximum layer thickness of 700 microns.

EXAMPLE 3

Used herein is a glass substrate having a diameter of 50 mm made of an optical glass commercially available as "BK 7". The glass substrate contains a curved surface having a radius of curvature of 53 mm, and a flat surface opposed to the curved surface.

After the curved surface of the glass substrate to which an aspherical resin layer was to be applied was polished, an aspherical resin layer was formed in a manner similar to that used in the Example 2, such as molding (e.g. pouring an epoxy resin into a gap having a predetermined area) (see, also, FIG. 3). A mold having a previously fabricated aspherical surface as a molding surface was fixedly mounted over the polished surface of the substrate 3 so that a gap or cavity having a predetermined size can be defined between the mold and the substrate 3. After the formation of the gap, a thermosetting epoxy resin was poured into this gap. The epoxy resin used herein is based on a bisphenol A epoxy resin composition and contains methylhexylhydrophthalic acid as a hardening agent. The molding apparatus was heated to a temperature of 130° C. to harden the epoxy resin in the gap. The mold was separated from the substrate 3 after hardening of the resin was completed. An aspherical resin layer 2 was thus formed over the curved surface of the substrate 3. Thereafter, another and flat surface of the substrate 3 was vacuum deposited with aluminum to make a thin layer of aluminum having a thickness of about 200 nm, i.e. the high reflectance layer 1. An aspherical mirror containing an aspherical epoxy resin layer 2 having a cross-section of FIG. 3 was thus obtained. The aspherical resin layer 2 had a thickness of 100 microns at a central portion thereof and a maximum layer thickness of 700 microns.

EXAMPLE 4

Used herein is a stainless steel substrate having a diameter of 50 mm, and containing a curved surface having a radius of curvature of 53 mm, and a flat surface opposed to the curved surface.

Only the curved surface of the stainless steel substrate to which surface an aspherical resin layer should be applied was lapped to form a reflecting layer. A mold having a previously fabricated aspherical surface as a molding surface was fixedly mounted over the lapped surface of the substrate so that a gap or cavity having a predetermined size can be defined between the mold and the substrate. After the formation of the gap, a thermosetting epoxy resin was poured into this gap. The epoxy resin used herein is based on a bisphenol A epoxy resin composition and contains methylhexylhydrophthalic acid as a hardening agent. The molding apparatus was heated to a temperature of 130° C. to harden the epoxy resin in the gap. The mold was separated from the substrate after hardening of the resin was completed. An aspherical mirror containing an aspherical epoxy resin layer having a cross-section similar to that of FIG. 3 was thus obtained. The aspherical resin layer had a thickness of 100 microns at a central portion thereof and a maximum layer thickness of 700 microns.

We claim:

1. A reflection-type compound optical element which comprises a glass substrate having applied, on a first surface, an aspherical resin layer, and on a second surface, opposite to said aspherical resin layer, a high reflectance layer, light incident onto said aspherical resin layer being reflected by said high reflectance layer and emitted through said aspherical resin layer.

2. A reflection-type compound optical element as claimed in claim 1, in which said aspherical resin layer comprises a photopolymerizable resin or a thermally polymerizable resin.

3. A reflection-type compound optical element as claimed in claim 1, in which said high reflectance layer comprises a metal material selected from the group consisting of aluminum, silver, gold and copper.

4. The reflection-type compound optical element according to claim 1, said first surface of said glass substrate being non-planar.

5. The reflection-type compound optical element according to claim 1, said first surface of said glass substrate being nonplanar.

6. The reflection-type compound optical element according to claim 1, said second surface comprising a lapped surface.

7. A reflection-type compound optical element comprising a glass substrate, said glass substrate having an aspherical resin layer on a first surface of said glass substrate and a high reflectance layer on a second surface of said glass substrate, said second surface of said glass substrate being opposite to said first surface of said glass substrate, light incident onto said compound optical element being transmitted by each of said glass substrate and said aspherical resin layer, and reflected by said high reflectance layer.

8. The reflection-type compound optical element according to claim 7, said aspherical resin layer comprising one of a photo polymerizable resin and a thermally polymerizable resin.

9. The reflection-type compound optical element according to claim 7, said high reflectance layer comprising a metal material selected from the group consisting of aluminum, silver, gold and copper.

10. The reflection-type compound optical element according to claim 7, said first surface of said glass substrate being nonplanar.

11. The reflection-type compound optical element according to claim 7, said first surface of said glass substrate being nonplanar.

12. The reflection-type compound optical element according to claim 7, said second surface comprising a lapped surface.

* * * * *